United States Patent [19]

Katoh

[11] Patent Number: 5,152,828
[45] Date of Patent: Oct. 6, 1992

[54] METHOD OF PRODUCING MOLD MATERIAL AND THE MOLD MATERIAL

[75] Inventor: Tatsuhiko Katoh, Okazaki, Japan

[73] Assignee: Sintokogio Ltd., Nagoya, Japan

[21] Appl. No.: 773,007

[22] Filed: Oct. 8, 1991

[30] Foreign Application Priority Data

Oct. 19, 1990 [JP] Japan .................. 2-282199

[51] Int. Cl.⁵ .................................. B22F 1/00
[52] U.S. Cl. .......................... 75/229; 75/246;
419/2; 419/24; 419/26; 419/39; 419/53;
419/54; 419/60; 419/68; 428/549; 428/550
[58] Field of Search .............. 75/229, 246; 428/549,
428/550; 419/24, 26, 2, 53, 54, 60, 68, 39

[56] References Cited

U.S. PATENT DOCUMENTS

| | | | |
|---|---|---|---|
| 4,420,336 | 12/1983 | Klar et al. | 75/246 |
| 4,613,369 | 9/1986 | Koehler | 75/246 |
| 4,828,930 | 5/1989 | Koehler | 428/550 |

FOREIGN PATENT DOCUMENTS

| | | |
|---|---|---|
| 0038558 | 10/1981 | European Pat. Off. |
| 1453092 | 10/1976 | United Kingdom |
| 2041979 | 9/1980 | United Kingdom |

OTHER PUBLICATIONS

Japanese Patent Office, Tokyo, JP; Abstract date: Apr. 18, 1991; and JP-A-28303 (Sintokogio Ltd.) Feb. 6, 1991.
Japanese Patent Office, Tokyo, JP; Abstract date: 199-07-90; and JP-A-2-115304 (Sintokogio Ltd.) Apr. 27, 1990.

Primary Examiner—Stephen J. Lechert, Jr.
Attorney, Agent, or Firm—Armstrong, Nikaido, Marmelstein, Kubovcik & Murray

[57] ABSTRACT

The present invention relates to a method of producing a mold material used for obtaining a mold for casting metals such as Zn, Al and the like or molding resins. In the method, the short fibers having an aspect ratio of 30 to 300 and obtained by cutting ferritic stainless steel long fibers having a width of 100 μm or less, ferritic stainless steel powder and at least one of Cu powder and Cu alloy powder are used as raw materials. The raw materials are blended to obtain a material mixture which is then compressed under pressure in a Cold Isostatic Press process. The thus obtained compressed product is sintered in a vacuum atmosphere. The sintered material is held in an atmosphere of nitrogen gas or decomposed ammonia gas so that 0.3 to 1.2 wt % of nitrogen is added to the stainless steel in the sintered material. The thus obtained mold material has a hardness of HMV 250 to 500.

10 Claims, 4 Drawing Sheets

METHOD OF PRODUCING MOLD MATERIAL AND THE MOLD MATERIAL

BACKGROUND OF THE INVENTION

1. Field of the Invention

The present invention relates to a method of producing a material (hereinafter referred to "mold material") used for forming a metallic mold body and the material obtained by the method. Particularly, the invention relates to a method of producing a material used for forming the body which has open pores over the entire wall of the body and which is, for example, used in metal casting or plastics molding.

2. Description of Related Art

The bodies of metal molds used in metal casting or plastics molding are generally formed through the steps of melting, casting and machining. The applicant of the present invention has previously proposed a mold material which is different from the materials obtained by conventional methods (JP-A-2-101102). The mold material contains short steel fibers each having an aspect ratio ($\mu/d$) of 30 to 100 and a width of 100 $\mu$m or less.

Such short steel fibers are produced by a wire cutting method known as a method of cutting a steel wire to a thin flat form along the lengthwise direction. Long fibers obtained by the method are cut into short fibers having an aspect ratio (l/d: l is the fiber length; d is the width of a fiber) of 30 to 100.

0.5 to 1.2 wt % of carbon powder and, if required, chromium powder and/or manganese powder are blended with the short steel fibers to obtain a blended material. The blended material is crammed, with a uniform density, into a press forming mold or a CIP (Cold Isostatic Press) rubber (for example, urethane rubber or neoprene rubber) mold and compressed at a pressure of 0.5 to 8 ton/cm$^2$. The thus obtained molded product is sintered in a reducing atmosphere to form a desired mold material.

The mold material has excellent strength and toughness and need not to be subjected to form air vent holes which are required in conventional molds made of tool steel because the mold material has already open pores which are uniformly distributed over the entire body. However, the mold material has a defect that the open pores are blocked up due to generation of rust, which is caused by oxidative corrosion of the short steel fibers in the material during use. The mold material also has a poor wear resistance because of low hardness.

SUMMARY OF THE INVENTION

Thus, it is an object of the invention to solve the above mentioned problems.

Another object is to provide a mold material which has open pores over the entire body and excellent corrosion resistance and which can be machined and increased in hardness by heat treatment.

Such a mold material is produced by the following method:

The method of producing the mold material in accordance with the invention comprises hollowing steps:

a) blending ferritic stainless steel powder, and at least one of copper powder and copper alloy powder with short fibers which have an aspect ratio (l/d) of 30 to 300 and which are obtained by cutting long ferritic stainless steel fibers produced by a wire cutting method and having a width of 100 $\mu$m or less;

b) charging a CIP rubber mold with blended the material obtained in step a with a uniform density and compressing it under pressure;

c) sintering the material compressed in step b in a vacuum atmosphere; and d) holding the sintered material obtained in step c in an atmosphere of nitrogen gas or decomposed ammonia gas so that 0.3 to 1.2 wt % of nitrogen is added to the sintered material.

In step a, preferable blending ratios of the ferritic stainless steel long fibers, the ferritic stainless steel powder and the copper powder are 36% by weight, 60% by weight and 4% by weight (when copper alloy powder is used, an amount corresponding to 4% by weight of copper powder), respectively. A Cu-Sn alloy such as 5 wt % Cu-25 wt % Sn alloy is recommended as a copper alloy. Since it is said that tin has a good influence on machinability and has no actual harm, tin is allowed to be added.

For example, JIS SUS434 (0.1 wt % C, 18 wt % Cr, 1 wt % Mo) is used as ferritic stainless steel. A stainless steel wire having diameter of 3 to 5 mm is cut into long fibers having a width of 20 to 50 $\mu$m by the wire cutting method. The long fibers are cut into short fibers with an aspect ratio (l/d) of 30 to 300 by using a cutter mill. If the aspect ratio is less than 30, since the fibers become powdery, necessary strength cannot be obtained because of a low level of interlocking of the fibers even if they are blended. On the other hand, if the aspect ratio exceeds 300, since the fibers are entangled during blending of the material, the material is nonuniformly blended.

The reason for using the ferritic stainless steel powder is that although a mold material having desired strength can be basically obtained by using ferritic stainless steel short fibers only, since the open pore size must be reduced in some cases depending upon the injection molding pressure or kinds of resin to be molded, the stainless steel powder is used for controlling the open pore size.

The reason for using copper powder and/or copper alloy powder is to recover the strength of the ferritic stainless steel after sintering. Although the radial crushing strength constant is increased depending upon the amount of the Cu and/or Cu alloy powder added, if the amount is 5% or more, a copper phase appears, and the material thus becomes unsuitable for use as a mold material. The radial crushing strength constant is determined from the value obtained by measurement of the compression load applied to the outer surface of a cylindrical bearing in the direction perpendicular to the axis of the bearing according to the method of testing strength of sintered bearings which is defined in JIS Z2507.

In the CIP (Cold Isostatic Press) process for molding the blended material under pressure, preferable molding pressure is 2 to 4 ton/cm$^2$. If the pressure is less than 2 ton/cm$^2$, the radial crushing strength constant is poor, while if the pressure exceeds 4 ton/cm$^2$, the porosity is decreased.

The molded material is preferably sintered at a vacuum of $1 \times 10^{-2}$ torr or less, while supplying nitrogen. The nitrogen is supplied to the vacuum in order to prevent the chromium in the stainless steel from evaporating when it is held in vacuum at a high temperature.

The nitriding treatment of holding the sintered material in an atmosphere of nitrogen gas or decomposed ammonia gas at a temperature of 900 to 1050° C. may be performed consecutively after the sintering process, or after the sintered material has been cooled. A time recommended for nitriding treatment is 30 minutes or more.

The mold material produced by the above stated method contains 0.3 to 1.2 wt % of nitrogen in the base metal by the nitriding treatment and has the hardness of HMV 50 to 500.

DETAILED DESCRIPTION OF THE INVENTION

In order to achieve the object, the inventor investigated the use of stainless steel fibers in place of the ferrous or ferro-alloy fibers disclosed in JP-A-2-101102. However, the use of stainless steel fibers has the following problems:

Stainless steel is generally divided into the three types, i.e., ferritic stainless steel, austenitic stainless steel and martensitic stainless steel.

Ferritic stainless steel is an Fe-Cr alloy having a low carbon content of 11.5 to 19% Cr. The alloy has the low hardness due to its low carbon content. The alloy can be cut because of the low hardness. On the other hand, the alloy cannot be hardened by quenching.

A austenitic stainless steel is an Fe-Cr alloy containing several percent of nickel and having an austenitic phase even at room temperature. Although the austenitic stainless steel generally has excellent corrosion resistance and heat resistance, work hardening takes place during cutting work, thus cutting is very difficult.

Martensitic stainless steel is a high carbon Fe-Cr alloy containing 11.5 to 19% Cr. Since the hardness of martensitic stainless steel is increased by increasing the carbon content (%), the hardness can be controlled. However, the corrosion resistance of the steel deteriorates as the carbon content is increased so that rust is generated easily.

In the present invention short fibers and powder mode of ferritic stainless steel are used as main components. Typical ferritic stainless steels, for example, are steels JIS SUS434 (C≦0.1, Cr: 16 to 19%, Mo: 0.5 to 2%), and JIS SUS430 (C≦0.03, Cr: 16 to 19%). Long flat fibers having a width 20 to 50 μm are produced from the wire of the ferritic stainless steels of the above stated chemical composition by the wire cutting method. The thus-produced long fibers are cut by a cutter mill to obtain short fibers with an aspect ratio of 30 to 300. The term "width" represents the diameter of a circle circumscribing the sectional area of the long flat fibers produced by cutting.

The short fibers have the fiber axis parallel with the cutting direction and are slightly curled as a whole. The short fibers also have a flat rectangular cross sectional form at right angles to the fiber axis and a band-like shape as a whole.

The ferritic stainless steel powder made of the above stated composition and copper powder or Cu-Sn powder are blended with the thus obtained short fibers to form a blended material. The blended material is then uniformly put into a rubber mold of the CIP process, compressed at a pressure of 2 to 4 ton/cm², and then sintered in a vacuum atmosphere. The sintered material is then kept in nitrogen gas or decomposed ammonia gas at a temperature of 900 to 1050° C. so that 0.3 to 1.2 wt % of nitrogen is added to the base metal of the stainless steel. As a result, a mold material having open pores over the entire surface thereof is obtained. Necessary hardness of the mold material can be increased by heat treatment without deteriorating the machinability and corrosion resistance.

DESCRIPTION OF THE PREFERRED EMBODIMENTS

A stainless steel wire of JIS SUS434 (C: 0.1%, Cr: 18%, Mo: 1%) having a diameter of 3 to 5 mm was cut by the wire cutting method along the axis thereof to form long fibers having a width 20 to 50 μm. The thus formed long fibers were cut by a cutter mill to obtain short fibers having an aspect ratio (l/d) of 30 to 300 (0.4 to 3.0 mm of length). 60 wt % of JIS SUS434 stainless steel powder (C: 0.05%, Cr: 17%, Mo: 2%) and 4 wt % of electrolytic copper powder were blended with 40 wt % of short fibers to obtain a blended material. The blended material was crammed into a rubber mold of the CIP process and compressed at a pressure of 3 ton/cm² to obtain a green compact. The green compact was then sintered under the sintering conditions shown in FIG. 1 to obtain a mold material.

Figure 1:
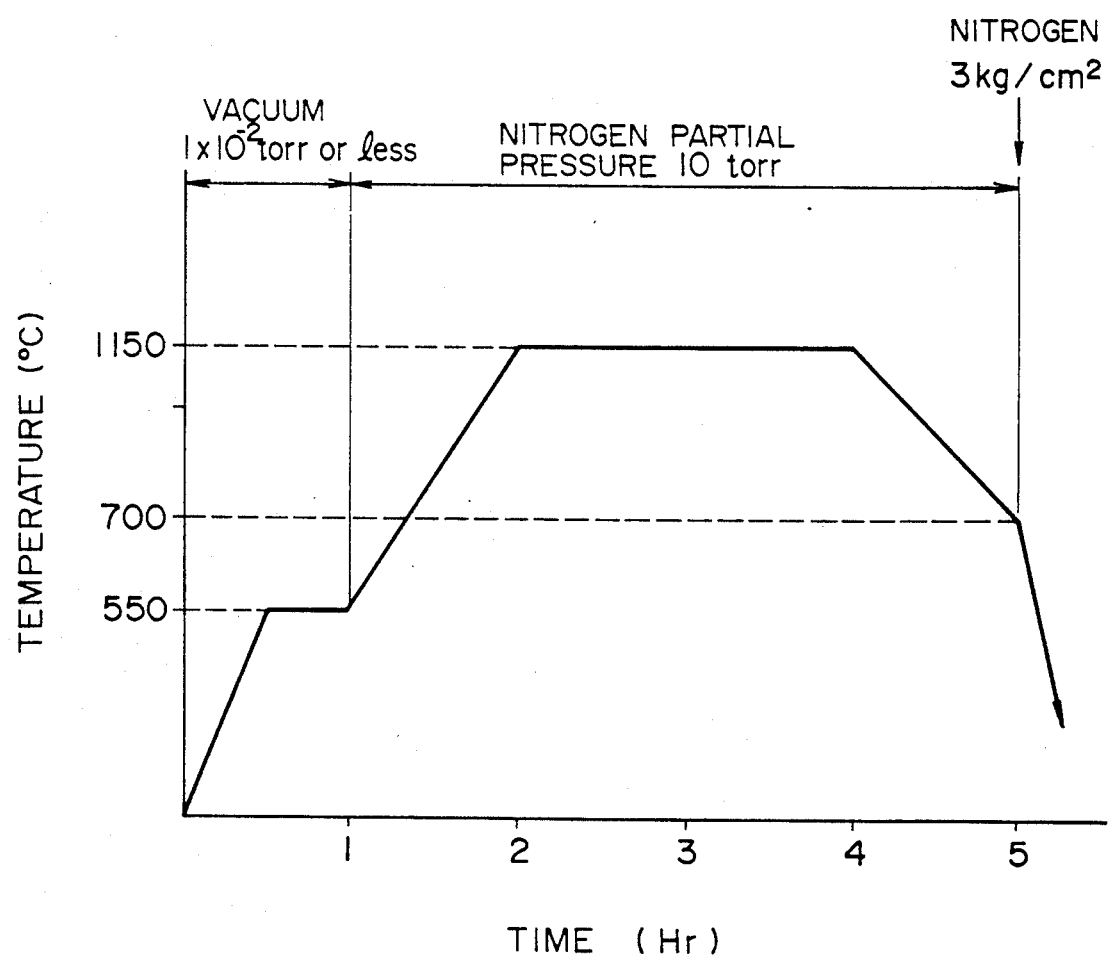
FIG. 1 is a graph showing conditions of sintering a compressed product.

The sintering conditions are described below with reference to FIG. 1. A block of 250 mm × 200 mm × 100 mm (about 30 kg) is used as a specimen and placed in a vacuum sintering furnace. After the pressure in the sintering furnace has been reduced to $1 \times 10^{-2}$ torr or less, the temperature is increased and kept at 550° C. for 30 minutes in order to sufficiently remove vaporizing components. After a vacuum of $1 \times 10^{-2}$ torr or less has been obtained, the temperature is again increased and kept at 1150° C. for 2 hours and then decreased to 700° C.

During this time, nitrogen at a partial pressure of 10 torr (10/780 atm) is supplied to prevent the chromium in stainless steel from evaporating when it is held in vacuum at a high temperature.

When the temperature becomes 700° C., nitrogen gas is supplied into the furnace at 3 kg/cm² so as to rapidly cool the specimen (the reason for starting rapid cooling at 700° C. is to prevent any change in the structure at the transformation temperature).

Figure 2:
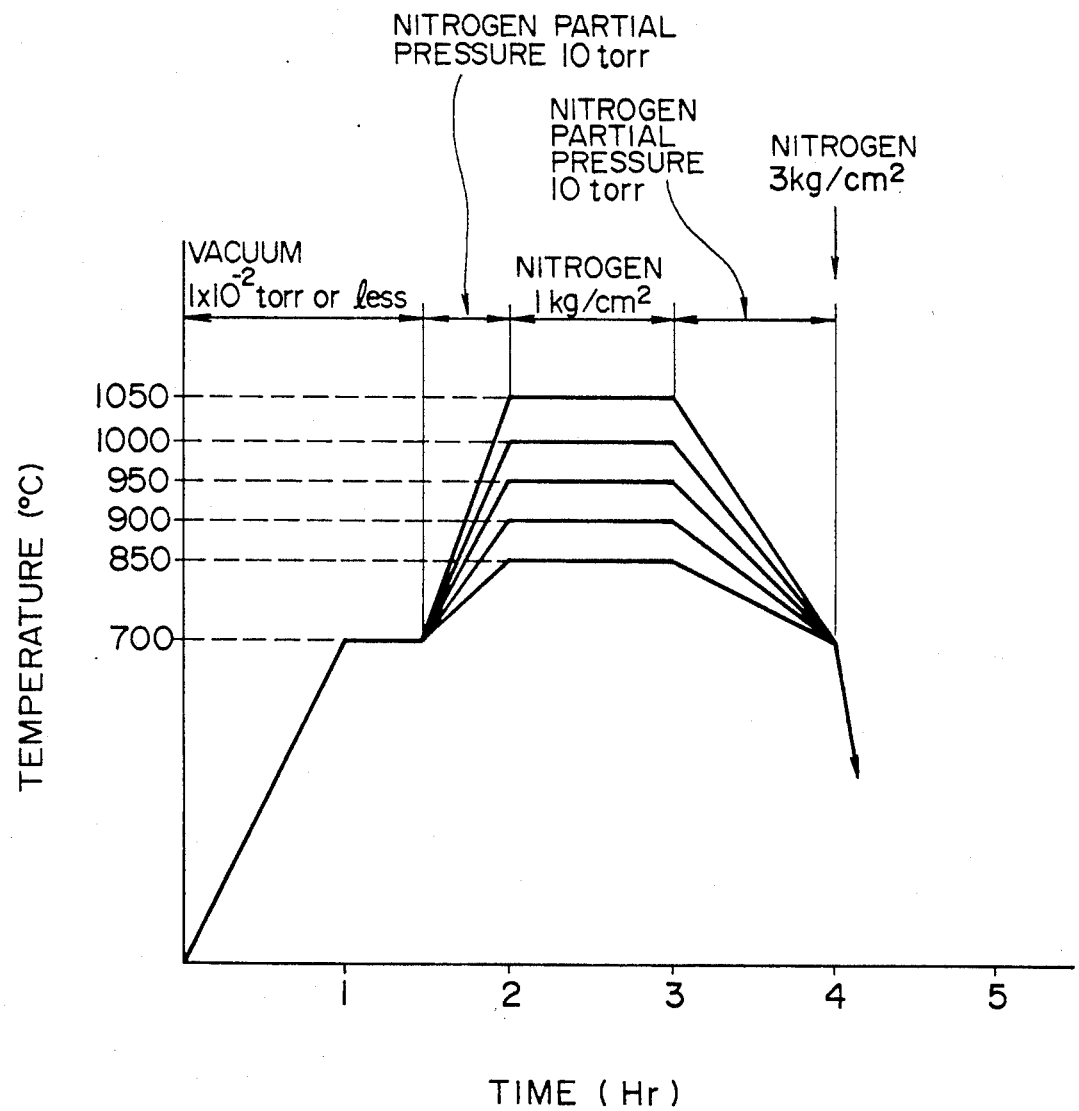
FIG. 2 is a graph showing conditions of nitriding a sintered body when the heating temperature is changed, while the holding time is kept constant.
Figure 3:
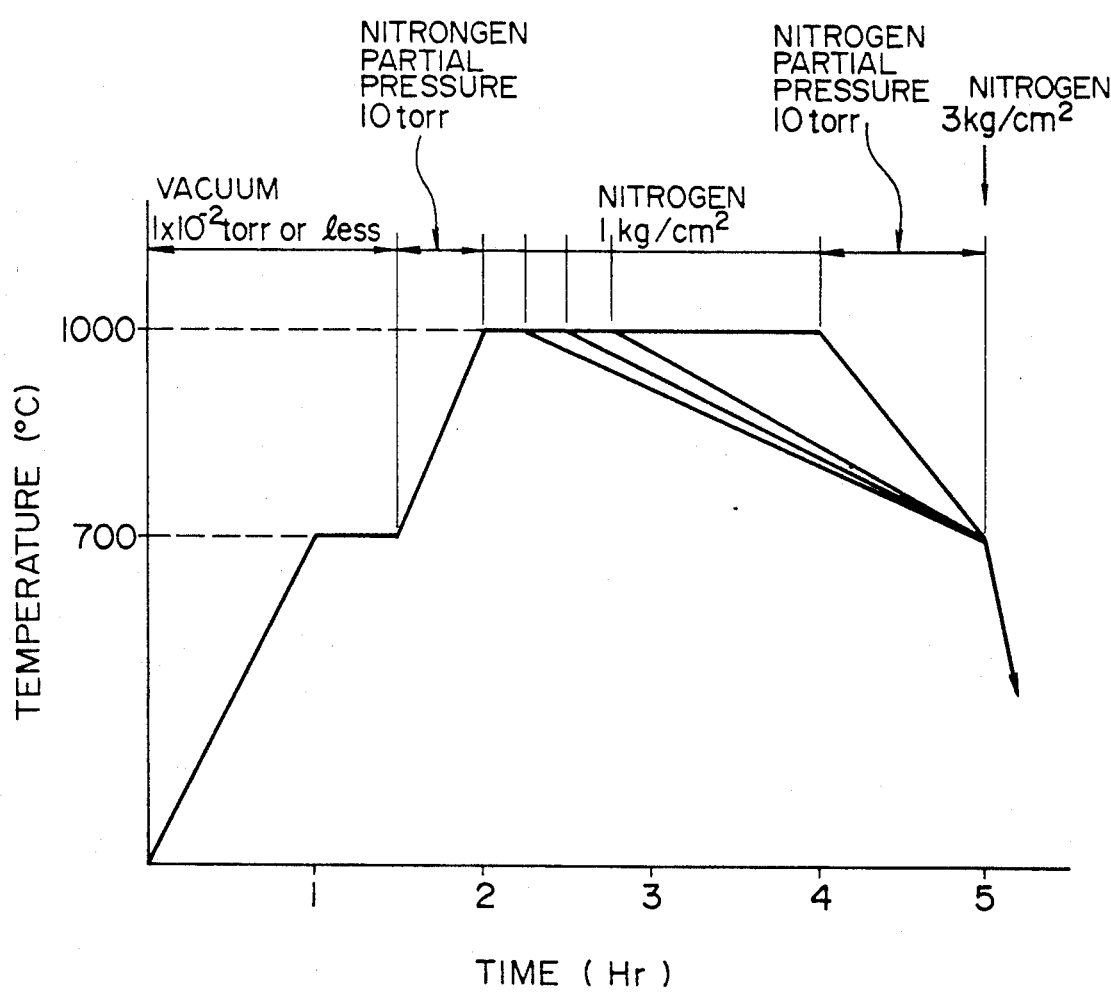
FIG. 3 is a graph showing conditions of nitriding a sintered body when the holding time is changed, while the heating temperature is kept constant.

Table 1 shows the results of analytical measurement of the components and hardness of each of specimens which were nitrided under the nitriding conditions shown in FIGS. 2 and 3.

The nitriding conditions are described below with reference to FIGS. 2 and 3. FIG. 2 shows the conditions when the holding temperature was changed while the holding time was kept constant, and FIG. 3 shows the conditions when the holding time was changed while the holding temperature was kept constant. After the pressure in a vacuum heat treatment furnace had been reduced to $1 \times 10^{-2}$ torr less, the temperature was increased and held at 700° C. for 30 minutes in order to sufficiently remove vaporizing components. After a vacuum of $1 \times 10^{-2}$ torr or less had been obtained, the temperature was again increased. The holding temperature or holding time was changed, and the nitriding treatment was effected in a nitrogen atmosphere.

TABLE 1

| Sample No. | Nitriding conditions | | | Analysis value | | | Hardness HMV |
|---|---|---|---|---|---|---|---|
| | Temp. (°C.) | Time | Nitrogen (1 kg/cm²) | C (%) | N (%) | O (%) | |
| 0 | — | — | — | 0.04 | 0.006 | 0.14 | 181 |
| 1 | 850 | 1 Hr | 1 | 0.04 | 0.29 | 0.19 | 235 |
| 2 | 900 | 1 Hr | 1 | 0.04 | 0.44 | 0.13 | 274 |
| 3 | 950 | 1 Hr | 1 | 0.04 | 0.95 | 0.16 | 421 |
| 4 | 1000 | 1 Hr | 1 | 0.03 | 1.20 | 0.12 | 472 |
| 5 | 1050 | 1 Hr | 1 | 0.03 | 1.37 | 0.18 | 506 |
| 6 | 1000 | 15 min | 1 | 0.04 | 0.52 | 0.19 | 291 |
| 7 | 1000 | 30 min | 1 | 0.04 | 0.61 | 0.17 | 304 |
| 8 | 1000 | 45 min | 1 | 0.03 | 0.80 | 0.15 | 384 |
| 9 | 1000 | 2 Hr | 1 | 0.03 | 1.41 | 0.17 | 508 |

*C: carbon, N: nitrogen, O: oxygen
Note 1: Sample number zero is as sintered only.
Note 2: Samples No. 1 to 5 were nitrided under the conditions shown in FIG. 2.
Note 3: Samples No. 6 to 9 were nitrided under the conditions shown in FIG. 3.

Sample No. 6 had to be held for 30 minutes or more in order to obtain a constant nitrogen content because of a large difference between the analysis values of nitrogen contents in the surface and interior of the sample.

Samples having hardness of HMV (Micro Vickers hardness) 500 or more and a nitrogen content of 1.2% or more are unsuitable as mold materials because a large amount of chromium nitride is produced in the surface layers (involving the inner surface layers of pores) of the samples. This makes it difficult to machine the samples.

In addition, when the nitrogen content is 0.3% or less, hardness of HMV 250 necessary as mold materials cannot be obtained.

EXAMPLE 1

No. 2 Sample (HMV 274), having excellent machinability and being able to be cut with the cutting speed which is equivalent to that of a usual mold material (JIS SKD61) was selected from the samples shown in Table 1. The results of measurement of the machinability, pore size and porosity of No. 2 Sample are shown in Table 2.

TABLE 2

| Bending strength (kg/mm²) | Tensile strength (kg/mm²) | Density (g/mm²) | Average Pore (μ) | Porosity (%) |
|---|---|---|---|---|
| 52.7 | 34.9 | 6.1 | 7.2 | 20.8 |

No. 2 Sample was machined to form a mold which was capable of simultaneously forming ten band-shaped products by molding ABS resin of the type that was widely used. Each of the products had a minimum thickness of 0.7 mm and a product size of 10 mm × 150 mm. As a result of plastics molding tests using the mold, products each having a perfect shape and no gas burning could be obtained at an injection pressure of 98 kg/cm², while an injection pressure of 138 kg/cm² was required when a usual mold material was used.

EXAMPLE 2

Figure 4:
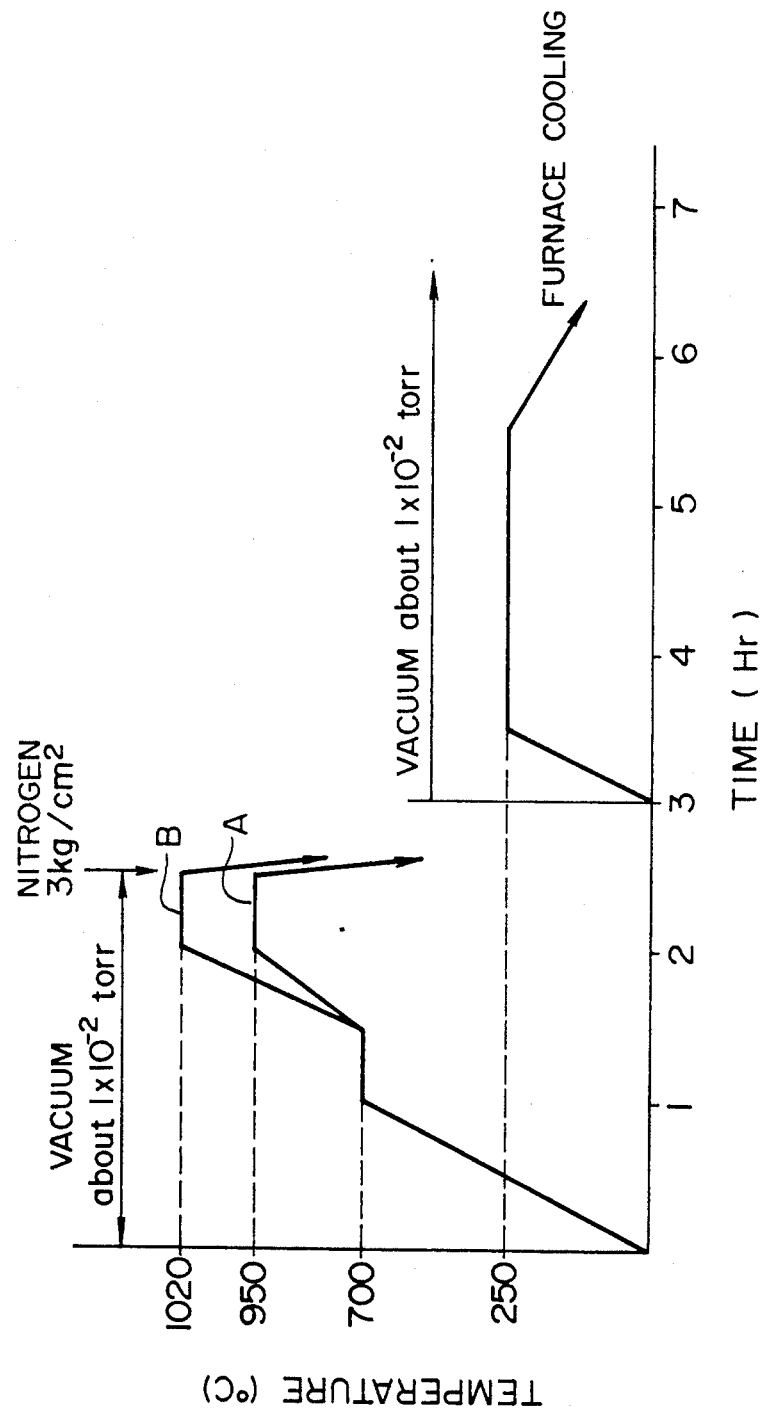
FIG. 4 is a graph showing conditions of vacuum quenching a metal mold material of the invention.

Table 3 shows the results of vacuum quenching tests performed for No. 3 and 7 samples shown in Table 1. The vacuum quenching conditions are described below with reference to FIG. 4. The pressure in a vacuum heat treatment furnace was decreased to about $1 \times 10^{-2}$ torr, and the temperature was then increased and kept at 700° C. for 30 minutes in order to sufficiently remove vaporizing components. After a vacuum of about $1 \times 10^{-2}$ torr had been obtained, the temperature was again increased and kept at 950° C., and 1020° C., respectively (see FIG. 4) for 30 minutes. Nitrogen gas at 3 kg/cm² was then supplied to quench each of the samples. After a degree of vacuum of about $1 \times 10^{-2}$ torr had been obtained in 30 minutes, the temperature was increased top 250° C. and kept at the temperature for 2 hours, and the furnace inside was then cooled.

The above-described vacuum quenching conditions are the same as those used for quenching usual mold materials. It was confirmed that a mold material having hardness of HMV about 600 can be obtained by vacuum heat treatment under usual conditions and can be satisfactorily used for molding glass fiber reinforced resins.

Although, in the above examples, sintering of a compressed product (or green compact) and nitriding treatment of a sintered body are respectively performed in separate treatment furnaces, such treatments may be continuously performed in a single heating cycle in the same furnace. The mold material is capable of overcoming the problems caused by oxidative corrosion because of the use of ferritic stainless steel as a main material, and allowing the hardness to be increased by quenching treatment performed after nitriding treatment. The mold material thus has excellent characteristics.

The mold obtained by machining the mold material of the present invention can be used, for example, for metal casting or plastics molding.

What is claimed is:

1. A method of producing a mold material comprising:
   a) blending ferritic stainless steel powder, and at least one of copper powder and copper alloy powder with short fibers which have an aspect ratio (l/d) of 30 to 300 and which are obtained by cutting long ferritic stainless steel fibers produced by a wire cutting method and having a width of 100 μm or less;
   b) charging a Cold Isostatic Press CIP rubber mold with the blended material obtained in step a with a uniform density and compressing it under pressure;
   c) sintering the material compressed in step b in a vacuum atmosphere; and
   d) holding the sintered material obtained in step c in an atmosphere of nitrogen gas or decomposed ammonia gas so that 0.3 to 1.2 wt % of nitrogen is added to the sintered material.

2. A method of producing a mold material according to claim 1, wherein said compressing is performed at a pressure of 2 to 4 ton/cm².

3. A method of producing a mold material according to claim 1, wherein said step of adding nitrogen to the sintered material is performed consecutively after said sintering step.

4. A method of producing a mold material according to claim 1, wherein said step of adding nitrogen to the sintered material is performed by reheating the sintered material after said sintering step.

5. A method of producing a mold material according to claim 1, wherein said short fibers having an aspect ratio of 30 to 300 are produced by cutting said long fibers having a width of 20 to 50 μm and produced by cutting a ferritic stainless steel wire of JIS SUS434 having diameter of 3 to 5 mm by a wire cutting method.

6. A method of producing a mold material according to claim 1, said blended material contains 60 wt % of said ferritic stainless steel powder and 4 wt % of electrolytic copper powder.

7. A method of producing a mold material according to claim 1, wherein the time taken for holding said blended material in said nitrogen atmosphere is at least 30 minutes.

8. A method of producing a mold material according to claim 1, wherein said sintering step comprises sintering said compressed material at a vacuum of $1 \times 10^{-2}$ torr or less, while nitrogen is supplied to provide a partial pressure of nitrogen in the vacuum.

9. A method of producing a mold material according to claim 1, further comprising holding said sintered material at a vacuum of $1 \times 10^{-2}$ torr or less and at 700° C. for 30 minutes before said step of adding nitrogen to said sintered material.

10. A mold material obtained by compressing under pressure a blended material used as a raw material and containing ferritic stainless steel short fibers having a width of 100 μm or less and an aspect ratio (l/d) of 30 to 300, ferritic stainless steel powder and at least one of copper powder and copper alloy powder, and sintering the obtained compressed product in a vacuum atmosphere, wherein the stainless steel which is a base metal in the mold material contains 0.3 to 1.2 wt % of nitrogen which is added by nitriding treatment and has hardness of HMV 250 to 500 and open pores over the entire wall which pass through the mold material.

* * * * *